June 24, 1947.  E. P. JUNG  2,422,734
DEVICE FOR REGULATING THE TEMPERATURE OF ELECTRIC
FURNACES OF THE RESISTANCE TYPE
Filed May 11, 1940
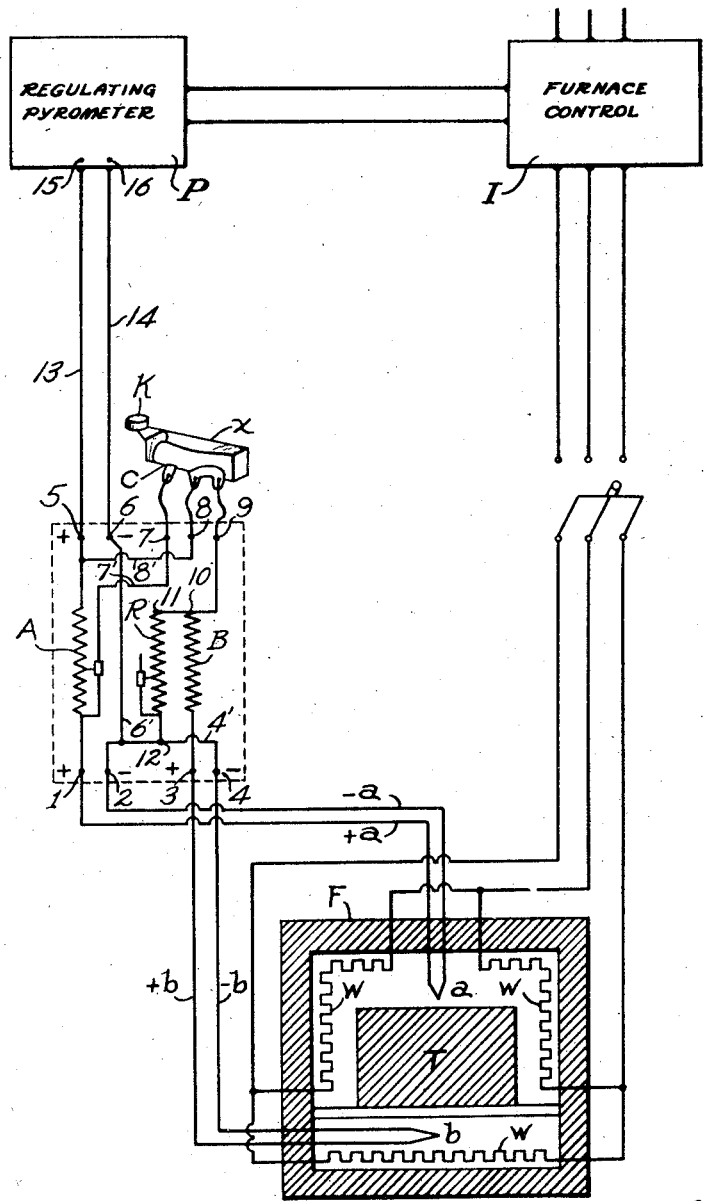
Inventor
Erwin Pierre Jung
By Louise O'Neil
Attorney Patented June 24, 1947

2,422,734

UNITED STATES PATENT OFFICE 2,422,734

DEVICE FOR REGULATING THE TEMPERATURE OF ELECTRIC FURNACES OF THE RESISTANCE TYPE

Erwin Pierre Jung, Paris, France; vested in the Attorney General of the United States Application May 11, 1940, Serial No. 334,633
In France May 23, 1939

2 Claims. (Cl. 13—24)

In the electric furnaces of the resistance type, use is generally made of devices adapted for automatically cutting off the current from the heating devices when the desired temperature is attained at a given point in the furnace, and for again supplying the current when the temperature at this point again becomes reduced.

The arrangement which consists in selecting the place for taking the temperature at a point near the pieces or objects which are to be heated in the furnace at a given temperature, is well known and in current use, but although the temperature of the pieces is thus exactly regulated, the temperature of the heating devices is fixed only between this lower limit and an upper limit which depends upon the conditions of transmission of heat in the furnace between the heating devices and the pieces to be heated.

For this reason, the temperature variations of the heating devices of the furnace may often reach considerable values, and chiefly, for instance, when a protecting screen of refractory ceramic material is placed between the pieces to be heated and the heating devices of the furnace.

When the temperature is very high and is near the maximum admissible limit for a given alloy of which the heating devices of the furnace are made, any great and frequent changes of temperature will hasten the oxidizing of the alloy, and this latter will also be damaged.

In order to obviate this drawback, the place of taking the regulating temperature is sometimes selected at a point near the heating devices, whose operating temperature is thus fixed in a definite manner. This arrangement will provide for the maximum life of the heating devices, but it will not give any exact indication of the temperature of the pieces or objects to be heated, and the condition of thermal equilibrium between these pieces and the heating devices of the furnace requires a long time to establish. Accordingly, this method is only used in practice for continuous furnaces or for furnaces whose temperature is to be kept up for a long time.

The object of the apparatus according to the invention is to obviate the above-mentioned drawbacks.

For this purpose, and in conformity to the invention, use is made of two devices for taking the temperature, such as pyro-electric couples, one of which is placed near the pieces to be heated, and the other near the heating devices, as well as an external apparatus which is adapted to reduce, according to the temperature of the pieces and according to a predetermined formula, the maximum temperature which can be attained by the heating devices of the furnace, and the regulating of the temperature of the furnace is effected upon these latter.

This will provide for a very small temperature variation in the heating devices, and this will practically depend only upon the sensitiveness of the regulating pyrometer, while the difference of temperature between the heating devices and the pieces to be heated, which is a maximum at the start, will tend towards zero according as the pieces become heated.

In conformity to one feature of the invention, the two couples can be connected in series, and the regulation is effected for a constant sum of the two electromotive forces produced, but this will require the use of special regulating pyrometers.

For the better understanding of the execution of the invention, reference will be made to the accompanying drawing, which shows a constructional form of a pyrometic device comprising two pyro-electric couples connected in parallel.

The pyro-electric couples $a$ and $b$ are located respectively near the piece T to be heated, and near the heating devices W located in the furnace F which is regulated by the regulating pyrometer P.

A set of ohmic resistances comprises nine terminals numbered from 1 to 9.

The positive wire $+a$ of the couple $a$ is connected to the terminal 1.

The negative wire $-a$ of the couple $a$ is connected to the terminal 2.

The positive wire $+b$ of the couple $b$ is connected to the terminal 3.

The negative wire $-b$ of the couple $b$ is connected to the terminal 4.

The terminal 5 is connected by the wire 13 to the positive terminal 15 of the pyrometer P.

The terminal 6 is connected by the wire 14 to the negative terminal 16 of the pyrometer P.

The terminals 7, 8 and 9 are connected to a switch C, which in the position shown in the drawing, connects the terminals 8 and 9 together, and in the position not shown in the drawings, they connect the terminals 7 and 8 together.

The terminal 1 is connected to the terminal 5 by the adjustable resistance A.

The terminal 3 is connected to the terminal 9 by the fixed resistance B.

The terminals 2, 4 and 6 are connected together by the wires 4' and 6', and also to the end 12 of an adjustable leakage resistance R.

The other end 11 of the leakage resistance R is connected by the wire 10 to the terminal 9.

The terminal 7 is connected to the terminal 4 by the wire 7'.

The terminal 8 is connected to the terminal 5 by the wire 8'.

The regulating pyrometer P is of any model in current use, and it is designed to operate upon a single couple; it may be of the type with potentiometer measurements or of the type with galvanometer deflection.

With the switch C in the position shown in the drawing, three branch circuits are connected to the terminals 15 and 16 of the pyrometer.

(1) The couple $a$ and the resistance A connected in series.
(2) The couple $b$ and the resistance B connected in series.
(3) The leakage resistance R.

The pyrometer P thus measures the difference of potential at the terminals of the leakage resistance R which shunts the couples $a$ and $b$ connected in parallel through the respective resistances A and B.

The switch C being in the second position, not shown in the drawings (turned counterclockwise about its pivotal axis), only the couple $a$ is directly connected to the terminals 15 and 16 of the pyrometer, the resistance A being short-circuited, and the couple $b$ and the resistances B and R no longer form part of the circuit of measurement of the pyrometer P. Thus the pyrometer P measures the electromotive force of the couple $a$ taken separately.

The pyrometer P which indicates the voltage across the terminals 15, 16 is designed to control the supply of current to the heating element W through the control apparatus I.

Assuming that the pyrometer is designed to operate at a voltage $E_1$ across the terminals 15, 16 and that E and E' are the electromotive forces produced by the couples $a$ and $b$, respectively, then $$E' = E_1 + kE_1 + p(E_1 - E)$$

when the potential across the terminals 15, 16 is $E_1$.

$k$ and $p$ in the equation are constants depending upon the ohmic resistances in the circuit. In the arrangement shown in the drawing $$k = \frac{B+b}{P+a}\left(\frac{A}{A+a} + \frac{P}{R} - \frac{a}{B+b}\right)$$

and $$p = \frac{B+b}{A+a}$$

where $a$ is the resistance of the couple $a$ and its leads;
$b$ is the resistance of the couple $b$ and its leads;
A is the resistance of the adjustable resistance A;
B is the resistance of the fixed resistance B;
R is the resistance of the adjustable leakage resistance R;
P is the internal resistance of the measuring circuit of the pyrometer P.

During the heating of the furnace charge, the possible overheating of the heating devices is at all times determined by the product of the factor $p$ and of the difference of temperature between the maximum fixed for the piece and the actual temperature of the latter, at the instant of control of the regulator, except for the law of translation of the couples.

During the maintenance of the temperature of the piece, the amplitude of the variations of temperature of the piece, cannot exceed the fraction $k$ of the temperature of the piece, for instance 2% of this temperature.

Normally, the switch C is in the position shown in the drawings, and the pyrometer P measures the difference of potential at the terminals of the leakage resistance R; by placing the switch in the other position the pyrometer P measures the temperature of the piece T.

The switch C can be operated manually for the control of the temperature at each instant.

The drawings show how this is obtained.

The switch C, which consists of a mercury bulb with three electrodes, can connect the central electrode to either of the lateral electrodes by tipping it in either direction.

This bulb is mounted on a support D which can be tipped about an axis X.

The said support is provided with a push-piece K for tilting the switch.

In this way, the pyrometer measures the temperature of the piece T during the whole time in which the said push-piece is kept lowered. It measures the difference of potential at the terminals of the leakage resistance R when—the push-piece K being no longer acted upon—the spring H has returned the switch C to the position shown in the drawings.

What I claim is:

1. In a device for regulating the temperature of electric furnaces of the resistance type, two means for taking the temperature, one of which is located near the pieces to be heated, and the other near the heating devices of the furnace, an apparatus, which is external with reference to said means for taking the temperature, adapted to reduce the maximum temperature of the heating devices according to the temperature of the pieces, according to a predetermined formula, the said means for taking the temperature being two pyro-electric couples, the external temperature-regulating apparatus comprising a pyrometer acting as a regulator for pyro-electric couples, whose internal resistance is known, a set of three ohmic resistances, through which the two pyro-electric couples are connected in parallel to the terminals of the pyrometer, and a switch having two positions adapted, in one of its positions, to cut off the couple from the heating devices and to connect the couple of the pieces directly to the pyrometer, which then measures the temperature of the pieces, whereas in its other position, said switch connects a leakage resistance to the terminals of the pyrometer to which the couples are connected in parallel, each through a resistance, and the pyrometer then measures a difference of potential depending upon the various ohmic resistances of the measuring circuit and upon the electromotive force of each couple, the idle position of said switch being the second position aforesaid for which the regulating is effected according to the predetermined formula, the operating of the switch permitting, at all times, the control of the temperature of the pieces at will.

2. In a device for regulating the temperature of electric furnaces of the resistance type, two means for taking temperature, one of which is located near the pieces to be heated and the other near the heating devices of the furnace, an apparatus which is external to the furnace and which is adapted to reduce the maximum temperature of the heating devices according to the temperature of the pieces, and according to a predetermined formula, the said two means for taking the temperature being two pyroelectric couples, the external apparatus comprising a pyrometer acting as a controlling means for the furnace, of a set of three ohmic resistances, means for connecting the couples in parallel with the pyrometer and each through one of the resistances with the third resistance bridging the pyrometer and means for connecting the couple near the pieces to be heated directly to the pyrometer.

ERWIN PIERRE JUNG.

REFERENCES CITED

The following references are of record in the file of this patent:

UNITED STATES PATENTS

| Number | Name | Date |
|---|---|---|
| 1,391,996 | Collins | Sept. 27, 1921 |
| 1,893,847 | Simpson | Jan. 10, 1933 |
| 1,815,061 | Harsch | July 21, 1931 |
| 1,985,967 | Wunsch | Jan. 1, 1935 |
| 1,664,965 | Bonds | Apr. 3, 1928 |
| 2,015,838 | Borden | Oct. 1, 1935 |